United States Patent
Hatano et al.

(10) Patent No.: US 8,064,655 B2
(45) Date of Patent: Nov. 22, 2011

(54) FACE IMAGE DETECTION DEVICE, FACE IMAGE DETECTION METHOD AND IMAGING APPARATUS

(75) Inventors: Toshinobu Hatano, Kyoto (JP); Hiroki Hachiyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 890 days.

(21) Appl. No.: 12/103,236

(22) Filed: Apr. 15, 2008

(65) Prior Publication Data

US 2008/0260213 A1 Oct. 23, 2008

(30) Foreign Application Priority Data

Apr. 20, 2007 (JP) ................................. 2007-111301
Mar. 19, 2008 (JP) ................................. 2008-071856

(51) Int. Cl.
*G06K 9/00* (2006.01)

(52) U.S. Cl. ........ 382/118; 382/103; 382/190; 382/276; 382/296

(58) Field of Classification Search .................. 382/100, 382/103, 115, 118, 190–195, 276, 291, 296–300
See application file for complete search history.

(56) References Cited

U.S. PATENT DOCUMENTS

| | | | | |
|---|---|---|---|---|
| 5,629,752 | A | * | 5/1997 | Kinjo ............................... 355/35 |
| 5,774,591 | A | * | 6/1998 | Black et al. .................... 382/236 |
| 5,987,191 | A | | 11/1999 | Suzuki |
| 6,009,210 | A | * | 12/1999 | Kang ............................. 382/276 |
| 6,111,667 | A | | 8/2000 | Mishima et al. |
| 6,128,397 | A | * | 10/2000 | Baluja et al. ................... 382/118 |
| 6,597,817 | B1 | * | 7/2003 | Silverbrook ................... 382/289 |
| 7,274,832 | B2 | | 9/2007 | Nicponski |
| 7,327,886 | B2 | * | 2/2008 | Ito .................................. 382/190 |
| 7,689,033 | B2 | * | 3/2010 | Xiao et al. ..................... 382/159 |
| 7,783,084 | B2 | * | 8/2010 | Imagawa et al. .............. 382/118 |
| 7,796,838 | B2 | * | 9/2010 | Okada et al. ................... 382/291 |
| 7,801,360 | B2 | * | 9/2010 | Hayashi ......................... 382/190 |
| 7,844,108 | B2 | * | 11/2010 | Sabe et al. ..................... 382/159 |
| 7,869,630 | B2 | * | 1/2011 | Matsuhira ...................... 382/118 |
| 2001/0036298 | A1 | | 11/2001 | Yamada et al. |
| 2002/0114464 | A1 | | 8/2002 | Wang |
| 2004/0022435 | A1 | * | 2/2004 | Ishida ............................ 382/190 |
| 2006/0045317 | A1 | * | 3/2006 | Adachi et al. ................. 382/118 |

FOREIGN PATENT DOCUMENTS

JP  2006-72770  3/2006

OTHER PUBLICATIONS

English language Abstract of JP 2006-72770.

* cited by examiner

*Primary Examiner* — Manav Seth
(74) *Attorney, Agent, or Firm* — Greenblum & Bernstein, P.L.C.

(57) ABSTRACT

An face image detection device capable of detecting the location of the face image with high accuracy without increasing time for detecting the location of the face image or electric consumption required for detecting the location of face image includes: a rotated reduced image data generation unit operable to generate n pieces of rotated reduced image data by reducing the input image data and rotating the reduced input image data by 360 ×i/n, where n is an integer equal to or larger than 2 and i ranges from 0 to n−1, each of the rotated reduced image data is rotated at intervals of 360/n degrees; and a face detection unit operable to detect the location of the face image from among the n pieces of rotated reduced image data.

12 Claims, 6 Drawing Sheets

FACE IMAGE DETECTION DEVICE, FACE IMAGE DETECTION METHOD AND IMAGING APPARATUS

BACKGROUND OF THE INVENTION (1) Field of the Invention

The present invention relates to a technology for improving speed and accuracy of face detection function used, for example, when photographing a person with digital cameras, and more particularly to a face image detection device provided in an image recording apparatus such as a digital camera and a personal computer.

(2) Description of the Related Art

The technology for detecting a location of human face has been used not only for surveillance systems, but also for commercial digital still cameras. In recent years, digital cameras have gained widespread use; the processing speed and the technology for high-image quality have dramatically improved. For example, the technology for detecting a face location has been in practical use for automatic focus function, automatic exposure correction function, and individual authentication by face identification for a person (especially for face) in digital cameras, along with the improvement on the performance of digital still camera, for example. In addition, the face location detecting technology is useful and expected to be widely applied as a technology for extracting a person from a moving image or still image when searching an image, indexing, or organizing an image album.

Patent Reference: Japanese Unexamined Patent Application Publication No. 2006-72770 has been proposed as a conventional technology for detecting the face location which enables improvement in accuracy of location detection regardless of the direction of face. In Patent Reference, when detecting the location of a face, a front face image is divided into the left half and the right half, and the location of the face image is detected using two sets of parameters, one is for the left half and the other is for the right half, without using parameters for the front face image. This increases a location detection rate for a face, not facing front but turning sideways.

However, in Patent Reference, it is necessary to perform reference and comparison processes for each set of parameters in order to detect the location of face image from one piece of input image since the location of the face image is detected using the two sets of parameters as described above. To put it differently, it is necessary to perform the reference comparison process twice. This causes problems in the time required for detecting the location of face image, and increase in power consumption necessary for detecting the location of face image.

Furthermore, in Patent Reference, the location of face image is detected with high accuracy when a person is turning sideways, however, there is a problem that the face image is not detected with high accuracy when the face image is rotated around the optical axis of a digital camera as the central axis.

SUMMARY OF THE INVENTION

The present invention has been conceived in order to solve the problem above, and it is an object of the present invention to provide a face image detection device capable of detecting a location of face image without increasing the time required for detecting the location of face image or increasing power consumption necessary for detecting the location of face image.

A face image detection device according to the present invention is a face image detection device which detects a location of a face image using input image data, the face image detection device including: a rotated reduced image data generation unit operable to generate n pieces of rotated reduced image data by reducing the input image data and rotating the reduced input image data by 360×i/n, where n is an integer equal to or larger than 2 and i ranges from 0 to n−1, each of the rotated reduced image data is rotated at intervals of 360/n degrees; and a face detection unit operable to detect the location of the face image from among the n pieces of rotated reduced image data.

With this configuration, the location of the face image is detected from the plural pieces of rotated reduced image data each of which is reduced image of the input image rotated by a different angle. This facilitates a highly accurate detection of the location of face image. In addition, the rotated reduced image data is reduced image of the input image data. With this, the location of the face image is detected at high speed, and thus the electric consumption can be reduced.

Preferably, the face detection unit detects the location of the face image from among the n pieces of rotated reduced image data using a method capable of detecting a location of a face image having at least within a 360/n-degree rotation range.

Since the face detection unit can detect the location of the face image having a rotation within 360/n degrees, the location of the face image can be detected at 360 degrees by detecting the location of the face image from n pieces of rotated reduced image data.

Furthermore, preferably, the face image detection device further includes: a rotated reduced image data identification unit which identifies a piece of rotated reduced image data of which the location of the face image is detected by the face detection unit from among the n pieces of rotated reduced image data; and an angle-setting value selection unit which selects a single angle-setting value used for detecting a location of a face image having a rotation angle (−θ) from among n angle-setting values each of which is at intervals of 360/n degrees, based on a rotation angle θ of the rotated reduced image data with respect to the input image data, the rotated reduced image data being identified by the rotated reduced image data identification unit, in which the face detection unit further detects the location of the face image from the input image data using the single angle-setting value selected by the angle-setting value selection unit.

Since the location of the face image is detected from the input image data using one of n angle-setting values, highly accurate face image location detection can be realized. For example, when a proportion of face in an image is small, the location of the face image can be detected from the input image data after an approximate rotation of the face image is determined from the plural pieces of rotated reduced image data. With this, the location of the face image can be detected using the most suitable angle-setting value, and the location of face image can be detected with high accuracy.

Furthermore, preferably, the angle-setting value selection unit further selects, when plural pieces of the rotated reduced image data are identified by the rotated reduced image data identification unit, plural angle-setting values each of which is used for detecting the location of the face image having the rotation angle (−θ) from among the n angle-setting values each of which is at intervals of 360/n degrees, based on plural rotation angles θ of the plural pieces of rotated reduced image data with respect to the input image data, and the face detection unit is further operable to sequentially take, when the plural pieces of the rotated reduced image data are identified by the rotated reduced image data identification unit, a single angle-setting value from among the plural angle-setting values selected by the angle-setting value selection unit and detect the location of the face image from the input image data using the single angle-setting value that has been taken.

When there is a face image having a rotation angle substantially identical to the permissible angle which can be detected the face detection unit, there is a case where two pieces of rotated reduced image data are identified. In this case, the location of the face image is detected based on an angle-setting value by alternately switching two angle-setting values respectively corresponding to the two pieces of rotated reduced image data. This facilitates an accurate detection of the location of the face image.

Furthermore, preferably, the face detection unit detects the location of the face image from among the n pieces of rotated reduced image data again, when the rotated reduced image data is not identified by the rotated reduced image data identification unit.

When there is no rotated reduced image data to be identified, it is determined that the rotation of the face image have changed or there is no face image in the input image data, and a location of a face image is performed from the n pieces of rotated reduced image data. With this, even when the rotation or the location of the face image changes by movement of subject or hand movement of the person taking the image while taking moving pictures or still images, the location of the face image may be accurately detected at high-speed following the change in the face image.

Furthermore, preferably, the face detection unit detects the location of the face image from among the n pieces of rotated reduced image data by using a predetermined angle-setting value used for detecting a location of a face image having a single predetermined rotation angle, the face image detection device further includes a rotated reduced image data identification unit operable to identify a piece of rotated reduced image data of which the location of the face image are detected by the face detection unit, and the face detection unit is further operable to detect, when plural pieces of the rotated reduced image data are identified by the rotated reduced image data identification unit, the location of the face image from among the plural pieces of rotated reduced image data identified by the rotated reduced image data identification unit using the predetermined angle-setting value.

When there is a face image having a rotation angle substantially identical to a permissible angle which represents an angle with which the location of the face image can be detected by the face detection unit, there is a case where two pieces of rotated reduced images are identified. In this case, the location of the face image can be detected from the two pieces of rotated reduced image data that have been identified.

Furthermore, preferably, the face detection unit detects the location of the face image from among the n pieces of rotated reduced image data using a single predetermined angle-setting value used for detecting a location of a face image having a predetermined rotation angle.

Since the location of the face image is detected using one angle-setting value, the location of the face image can be detected at high speed and thus the electric consumption can be reduced.

Furthermore, preferably, the rotated reduced image data generation unit further generates a single piece of face detection image including the n pieces of rotated reduced image data, and the face detection unit detects the location of the face image from the single piece of face detection image.

With this, the location of the face image can be detected at one time from the piece of face detection image data in which plural pieces of face images having different rotations. With this, the location of the face image is detected at high speed. With this, the electric consumption of the face image detection device can be reduced.

Note that the present invention can be realized, not only as the face image detection device having these characteristic units, but also as a face image detection method having the characteristic units included in the face image detection device as steps, and as a program causing a computer to execute the characteristic steps included in the face image detection method. Furthermore, it is needless to say that such a program can be distributed via a recording medium such as Compact Disc-Read Only Memory (CD-ROM) and via the communication network such as the Internet.

In addition, the present invention can also be realized as an imaging apparatus including the face image detection device.

According to the present invention, even when detecting the location of the face image when the face of a person in an image is rotated, the detection speed of the location can be improved, the electric consumption can be reduced, and the detection accuracy of the location can be improved. For example, the location of face image can be detected at high speed and with high accuracy even with a composition in which a baby is held. Furthermore, with the present invention, it is possible to provide a digital camera capable of performing automatic focus function and automatic exposure correction function on a person or face with high accuracy.

FURTHER INFORMATION ABOUT TECHNICAL BACKGROUND TO THIS APPLICATION

The disclosure of Japanese Patent Application No. 2007-111301 filed on Apr. 20, 2007 and Japanese Patent Application No. 2008-71856 filed on Mar. 19, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

A face image detection device according to the present invention will be described hereinafter with reference to the drawings.

Figure 1:
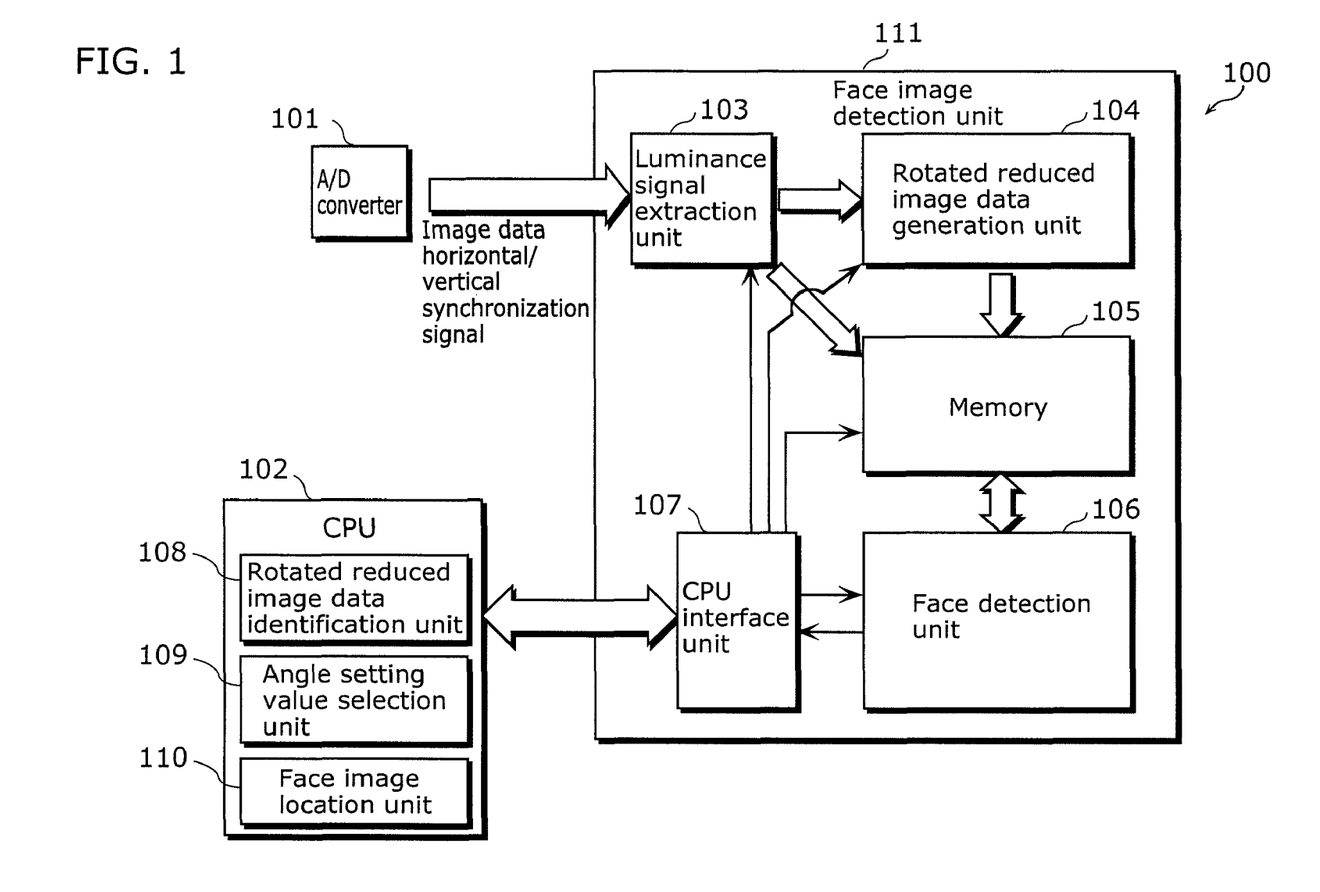
FIG. 1 is a block diagram showing the configuration of the face image detection device according to the embodiment of the present invention.

FIG. 1 is a block diagram showing the configuration of the face image detection device according to the embodiment of the present invention.

The face image detection device 100 includes an Analog to Digital (A/D) converter 101, a face image detection unit 111, and a Central Processing Unit (CPU) 102.

The A/D converter 101 is processing unit which converts analog image data signals of the input image data to digital image data signals. Note that Digital Signal Processor (DSP) provided inside the A/D converter 101 may output the digital image data signal after converting the digital image data signal into image data signals in REC 601 or in REC 656, which are standard signals, or image data signals compliant to a universal input format.

The face image detection unit 111 detects a location of face image included in the input image data from the image data signal (input image data) outputted from the A/D converter 101, and includes a luminance signal extraction unit 103, a rotated reduced image data generation unit 104, a memory 105, a face detection unit 106, and a CPU interface unit 107.

The luminance signal extraction unit 103 is a processing unit which extracts luminance signals from input image data, and generates luminance signal data.

The rotated reduced image data generation unit 104 is a processing unit which writes a predetermined-sized data used for face image location detection to the memory 105 while performing filtering and reduction-resizing to the luminance signal data extracted in the luminance signal extraction unit 103.

The memory 105 is a storage device for storing the luminance signal data of the input image data extracted by the luminance signal extraction unit 103 and the face detection image data generated by the rotated reduced image data generation unit 104.

The face detection unit 106 is a processing unit which accesses the luminance signal data or the face detection image data stored in the memory 105 and detects the location, the size, and the rotation of face image. The face detection unit 106 stores 4 types of face detection parameters suitable for detecting face image location without a rotation to the right and left, and the location of the face image and the like is detected based on one of the face detection parameters. The processing in the face detection unit 106 is not repeated here since the known technology can be used and the processing is not the main focus of the present application. Note that the face detection parameter includes digitalized luminance distribution in a general face image. The four types of face detection parameters stored in the face detection unit 106 includes face detection parameters when the angle-setting value showing a rotation of the face image is 0 degrees, 90 degrees, 180 degrees, and 270 degrees, respectively. For example, the face detection parameter with the angle-setting value of 90 degrees is most suitable for detecting a location of a face image rotated at 90 degrees.

The CPU interface unit 107 is a processing unit which controls system operations in the luminance signal extraction unit 103, the rotated reduced image data generation unit 104, and the face detection unit 106 in response to the instruction from the CPU 102.

The CPU 102 is a processing unit for controlling the system operations of the face image detection unit 111 via the CPU interface unit 107, and functionally includes (as processing units implemented by executing the control program on the CPU 102) a rotated reduced image data identification unit 108, an angle-setting value selection unit 109, and a face image location unit 110.

The rotated reduced image data identification unit 108 is a processing unit which identifies, among the data resized in the rotated reduced image data generation unit 104, data in which the location of the face image is detected by the face detection unit 106.

The angle-setting value selection unit 109 is a processing unit for setting face detection parameter which includes an angle-setting value used for face image location detection by the face detection unit 106.

The face image location unit 110 locates the location of the face image in the input image data from the location of the face image detected by the face detection unit 106 and correspondence between the data that has been identified by the rotated reduced image data identification unit 108 and the location of the input data.

Next, the operations of the face image detection device 100 are described.

The luminance signal extraction unit 103 extracts luminance signals to be used for detecting the location of face image from the input image data, and generate luminance signal data each time image data is inputted.

Figure 2:
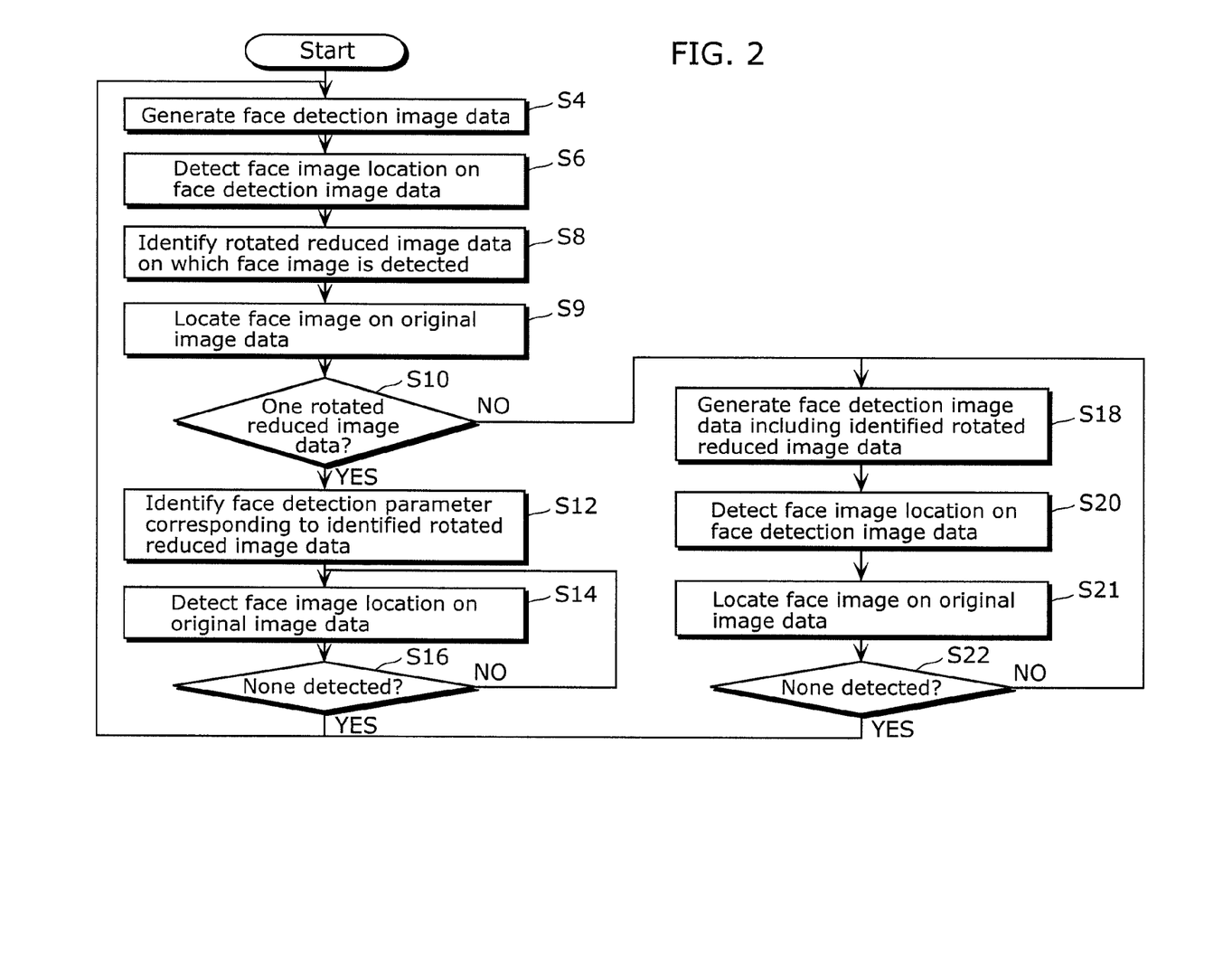
FIG. 2 is a flowchart showing operations of the face image detection device.

FIG. 2 is a flowchart showing the operations of the CPU 102, the rotated reduced image data generation unit 104, the memory 105, the face detection unit 106 and the CPU interface unit 107 in the face image detection device 100.

Note that, in the description hereinafter, the processing from S4 to S9, S10 to S16, and S10 and S18 to S22 is respectively performed within one frame period (for example, 1/30 second).

The luminance signal outputted from the luminance signal extraction unit 103 is luminance signal data of the input image data of a predetermined size. Thus, the rotated reduced image data generation unit 104 generates luminance data (face detection image data) on which filtering and reduction-resizing is performed in order to convert the size of the luminance signal data to a predetermined size defined in the face detection unit 106, and writes the face detection image data to the memory 105 at a predetermined size (S4).

The face detection unit 106 accesses the face detection image data stored in the memory 105 and detects the location, size, and rotation of the face image (S6).

Here, it is assumed that a type of face detection parameter most suitable for detecting the location of face image without a rotation to the right and left is set in the face detection unit 106. In the face image location detection using the face detection parameter, the location of face image rotationed by a maximum of 45 degrees to the right and left can be detected (hereinafter referred to as "having 45 degrees of permissible rotation angle"). In this case, in the process in S4, the rotated reduced image data generation unit 104 generates reduced image data by reducing the size of the luminance signal data of the input image (hereinafter referred to as "original image data") to no more than 1/n (n=4) of the predetermined size of the face detection image data. In addition, the rotated reduced image data generation unit 104 generates a piece of face detection image data in which four pieces of rotated reduced image data that are obtained by rotating the image data for 360/n (n=4), or 90 degrees are put together. For this reason, the rotated reduced image data generation unit 104 performs mapping of four pieces of rotated reduced image data within the predetermined sized address of the face detection image data by rotating the reduced image data at 90 degrees each time, and writes the four pieces of the rotated reduced image data to the memory 105 at high speed. The amount of data written in the memory 105 equals to a piece of the face detection image in the predetermined size. Thus, the data amount is identical when writing four pieces of rotated reduced image data is to be written and when writing original data, and thus there is minor increase in electricity consumption.

Figure 3:
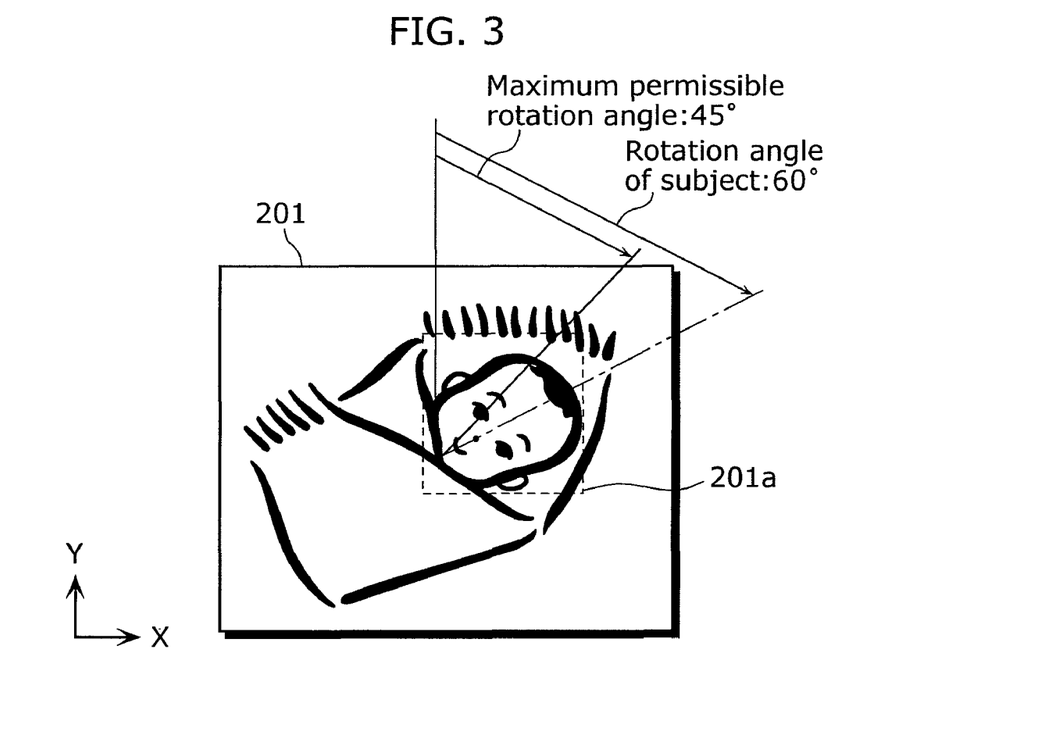
FIG. 3 shows an example of original image data.

FIG. 3 shows an example of original image data. The original image data 201 is image data of a baby as a subject, and it is assumed that the rotation angle of the face of the subject is 60 degrees, exceeding the permissible rotation angle of the face image location detection in the face detection unit 106.

Figure 4:
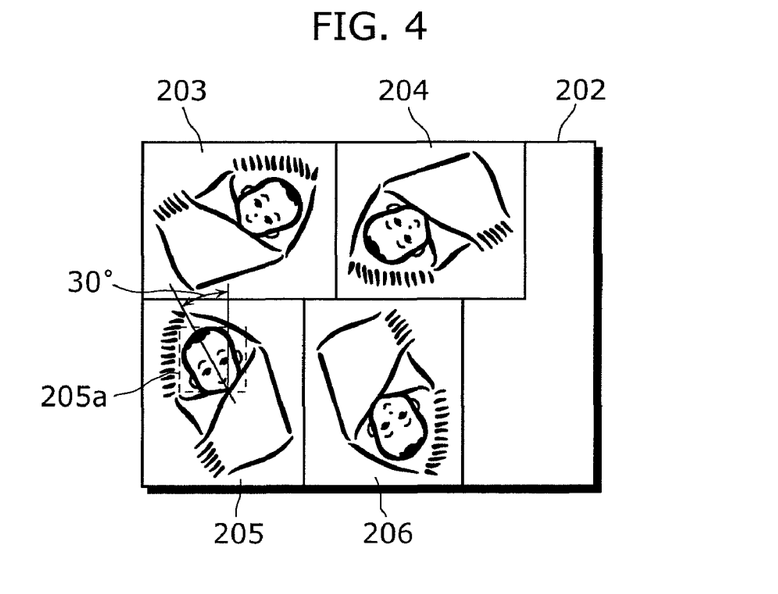
FIGS. 4 to 6 show examples of face detection image data.

FIG. 4 shows an example of the face detection image data. It is assumed that a predetermined size of the face detection image data 202 is identical to the image size of the original image data 201. The face detection image data 202 is image data on which four pieces of rotated reduced image data 203 to 206 are put together so as to fit within a predetermined size. The rotated reduced image data 203 is rotated at 0 degree with respect to the original image data 201. The rotated reduced image data 204 is rotated at 180 degrees with respect to the original image data 201. The rotated reduced image data 205 is rotated at 270 degrees clockwise with respect to the original image data 201. The rotated reduced image data 206 is rotated at 90 degrees clockwise with respect to the original image data 201.

In the processing in S6, the face detection unit 106 reads a piece of face detection image data 202 in which four types of images are put together within the predetermined size, and detects location of the face image. This processing allows the face image location detection on the four types of image information at one time. An image having a face rotated over 45 degrees to the right and left on which the face image location detection cannot be performed such as the original image data 201, the face image location detection is performed on the four reduced images each rotated by 90 degrees. With this, on the rotated reduced image data 205 on which the face is rotated within 45 degrees to the right and left, the location, size, and rotation of the face image 205a are detected.

Next, the rotated reduced image data identification unit 108 identifies, out of the four types of rotated reduced image data, data in which the location of face image is detected in the face detection unit 106 (S8). For example, the face detection image data 202 shown in FIG. 4, the rotated reduced image data 205 is identified as the rotated reduced image data on which the location of face image is detected. Since the arrangement of the four types of rotated reduced image data is determined in advance, the rotated reduced image data is identified by the location of the face image detected on the original image data.

The face image location determination unit 110 detects the location, size, and rotation of the face image on the original image data from the location of the face image in the rotated reduced image data that has been identified (S9). The correspondence of image data between the rotated reduced image data and the original image data is known when writing the rotated reduced image data to the memory (105) in the rotated reduced image generation unit 104. In addition, the reduction rate is also known in advance. Thus, the location and the size of face image on the original image data can be calculated based on the information. In addition, since the rotation angle when generating the rotated reduced image data has also been known, the rotation of the face image on the original image data can be calculated from the rotation on the rotated reduced image data.

When there is only one piece of rotated reduced image data on which the location of the face image is detected (YES in S10), the angle-setting value selection unit 109 identifies a face detection parameter including an angle-setting value by identifying the angle-setting value used for the face image location detection in the face detection unit 106 from the rotated reduced image data that has been identified in the rotated reduced image data identification unit 108 (S12).

When a location of the face image is detected in one of the four types of rotated reduced image, a rotation composition of the person can be determined based on the information regarding a rotation angle of each piece of the rotated reduced images mapped in the memory 105 by the writing control of the memory 105. In the example shown in FIGS. 3 and 4, the location of the face image 205a is detected in the rotated reduced image data 205, of which the original image data 201 is rotated approximately by 90 degrees counterclockwise, and thus it is determined that the face image 201a of the subject in the original image data 201 is rotated approximately by 90 degrees clockwise. Thus, the angle-setting value selection unit 109 identifies the angle-setting value as 90 degrees and outputs the angle-setting value to the face detection unit 106. This identifies the face detection parameter including the angle-setting value used for the face image location detection in the face detection unit 106.

The face detection unit 106 accesses the original image data stored in the memory 105, and detects the location, size and rotation of the face image using the face detection parameter including the angle-setting value (S14). In the example described above, the angle-setting value is identified as 90 degrees. Thus the face detection unit 106 accesses the original image data 201 shown in FIG. 3 and detects the location, size, and rotation of the face image 201a using the face detection parameter including the angle-setting value of 90 degrees. Note that the original image data stored in the memory 105 is continuously updated. Thus, the face detection unit 106 detects the face image location from the latest original image data.

The face detection unit 106 detects the location of the face image from the original image data 201 while the face image location is detected (NO in S16, S14).

When the face image location is no longer detected (YES in S16), the processing after S4 is repeated.

Figure 5:
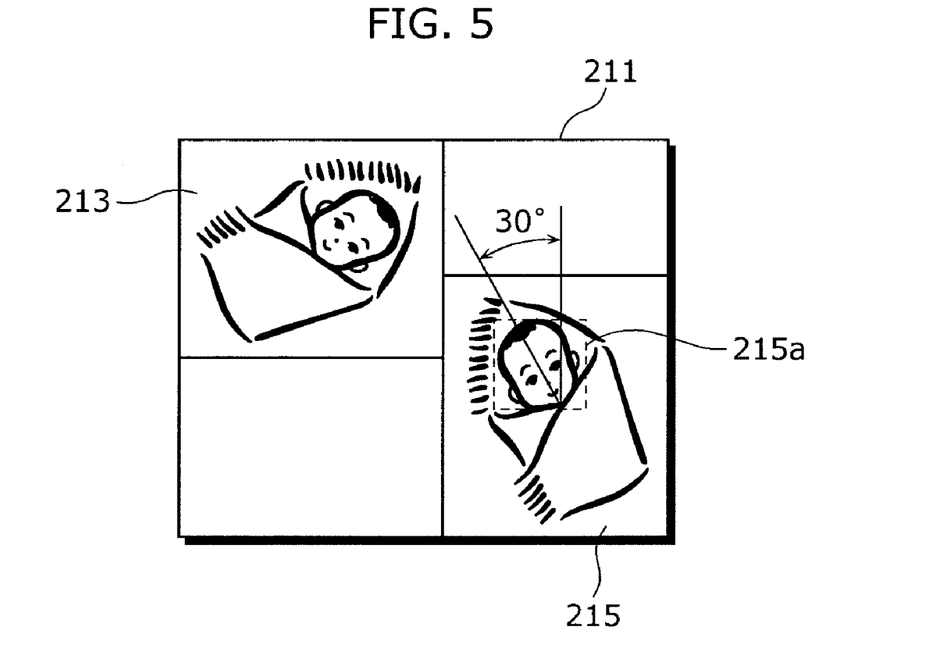

When the face image location is detected from plural pieces of rotated reduced image data in the processing S10 (NO in S10), the rotated reduced image data generation unit 104 generates the face detection image data by filtering and reduction, the luminance signal data outputted from the luminance signal extraction unit 103 such that only the pieces of rotated reduced image data identified by the rotated reduced image data identification unit 108 fits the predetermined size of the face detection image data. The rotated reduced image data generation unit 104 writes the generated face detection image data to the memory 105 (S18). For example, when the location of the face image is detected from the rotated reduced image data 203 and 205 among the face detection image data 202 shown in FIG. 4, the rotated reduced image data generation unit 104 generates the face detection image data 211 in which two types of rotated reduced image data, namely, the rotated reduced image data 213 and 215 are mapped within the predetermined size of the face detection image data as shown in FIG. 5.

The face detection unit 106 accesses the face detection image data stored in the memory 105 in S18 and detects the location, the size, and the rotation of face image (S20).

The face image location unit 110 detects the location, size, and rotation of the face image on the original image data from the location of the face image data on the rotated reduced image data that has been identified (S21). For example, it is assumed that the location of the face image 205a is detected from the rotated reduced image data 215 of the face detection image data 211, and the rotation of the face 215a is detected at 330 degrees clockwise (30 degrees counterclockwise). Here, the rotated reduced image data 215 on which the face 215a is included is rotated at 270 degrees clockwise with respect to the original image data 201. Thus, the rotation of the face image 201a in the original image data 201 is calculated as 60 (=330−270) degrees clockwise.

The face detection unit 106 detects the location of the face image from the face detection image data while the face image location is detected (NO in S22, S18, S20).

When the face image location is no longer detected (YES in S22), the processing after S4 is repeated.

As described above, according to the present embodiment, the face image having a rotation more than the permissible face rotation angle, the location of the face image can be detected at high speed using one type of the face detection parameter without using plural types of the face detection parameters. More specifically, the detection speed of the location of the face image can be improved by detecting the location of the face image after the location of the face image is detected within the face detection image data. Thus, the electric consumption of the face image detection device 100 can be reduced.

In addition, the location of face image is detected on the original image data using one of four types of the face detection parameters each rotated at 90 degrees, highly accurate face image location detection can be realized. For example, when the proportion of the face image in the original data is small, the location of face image can be detected from the original data instead of the face detection image data after the rotation has been approximately determined from the face detection image data on which the pieces of rotated reduced image data are put together. This facilitates a highly accurate detection of the location of face image.

While detecting the location of the face image limiting the face detection parameter to one type, when no location of face image is detected, it is determined that the rotation in the face image is changed or the face image does not exist in the input image data, processing after generation of the face detection image data is repeated. With this, even when the rotation or the location of the face image changes by a movement of the subject or a hand movement of the person taking the image while taking moving pictures or still images, the location of the face image can be accurately detected at high-speed following the change in the face image.

In addition, the face detection image data is at a predetermined size used for detecting the location of the face image. This enables high-speed writing to the memory 105 and high-speed operation of the face detection unit 106. With this, the electric consumption of the face image detection device 100 can be reduced.

In addition, when there is a face image having a rotation angle substantially identical to the permissible rotation angle of the face detection unit 106, there is a case where the location of the face image is detected from two rotated reduced images, however, even in such a case, the location and the rotation of face image can be detected with high accuracy.

The face image detection device according to the embodiment of the present invention has been described, however, the present invention is not limited to the embodiment.

For example, when the face image location is detected from the plural pieces of rotated reduced image data in the operations of the face image detection device 100 shown in FIG. 2, the face image location is detected from the face detection image data, however, the face image location may be detected from the original image data. In this case, the angle-setting value selection unit 109 identifies the types of face detection parameters including the angle-setting values by identifying plural angle-setting values corresponding to the pieces rotated reduced image data. The face detection unit 106 sequentially takes one type of face detection parameter from among the types of face detection parameters that have been identified, and detects the location of the face image from the original image data. This facilitates an accurate detection of the location of face image.

Figure 6:
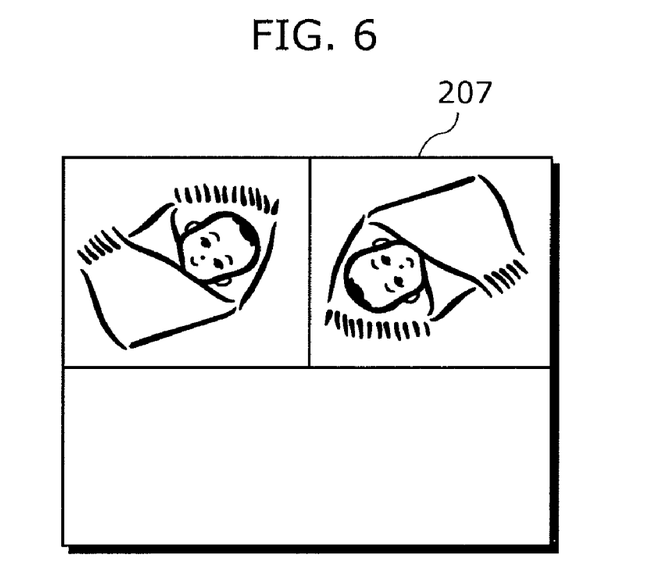

In addition, in the embodiment described above, the face detection image data is generated by writing memory for four times while rotating the image data generated by reducing the luminance signal data by 90 (=45×2) degrees. However, it is needless to say that the present invention is applicable even when the permissible rotation angle is not 45 degrees. For example, when the permissible rotation angle is 90 degrees, the face detection data may be generated by writing the memory twice while rotating the image data which is reduced luminance signal data by 180 (=90×2) degrees. FIG. 6 shows an example of the face detection image data 207 generated by writing memory twice while rotating the image data which is reduced original image data 201 shown in FIG. 3 by 180 degrees. The face detection unit 106 detects the face image location on the face detection image data 207. With this, the face image location is detected from one of two rotated reduced image data.

Note that the face image detection device 100 may be incorporated in digital cameras such as general digital still cameras and digital movie cameras.

Figure 7:
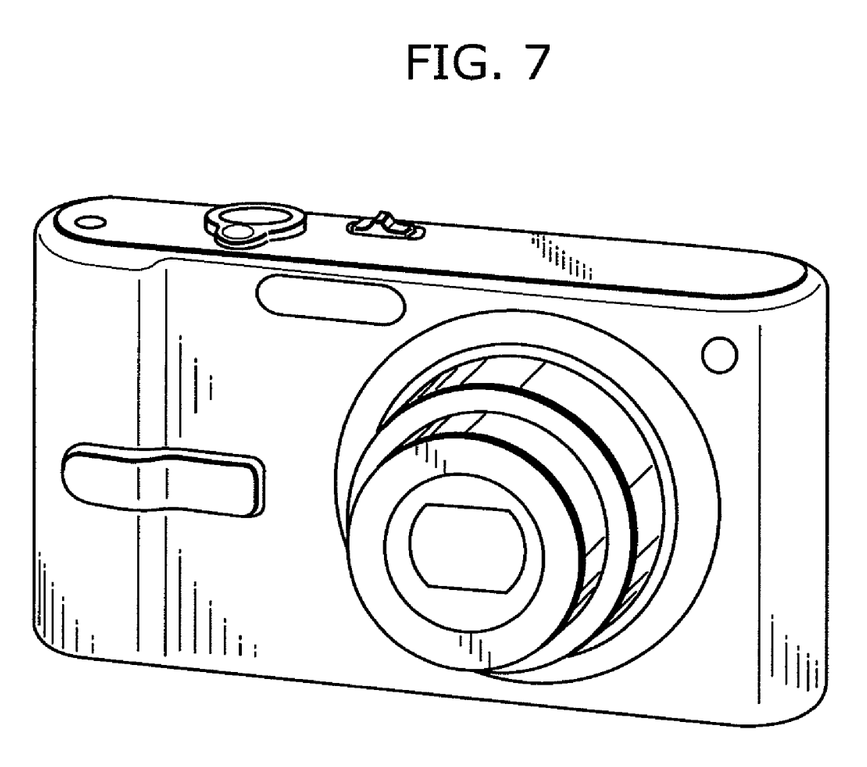
FIG. 7 shows an example of an appearance of digital still camera to which a face image detection device is incorporated.
Figure 8:
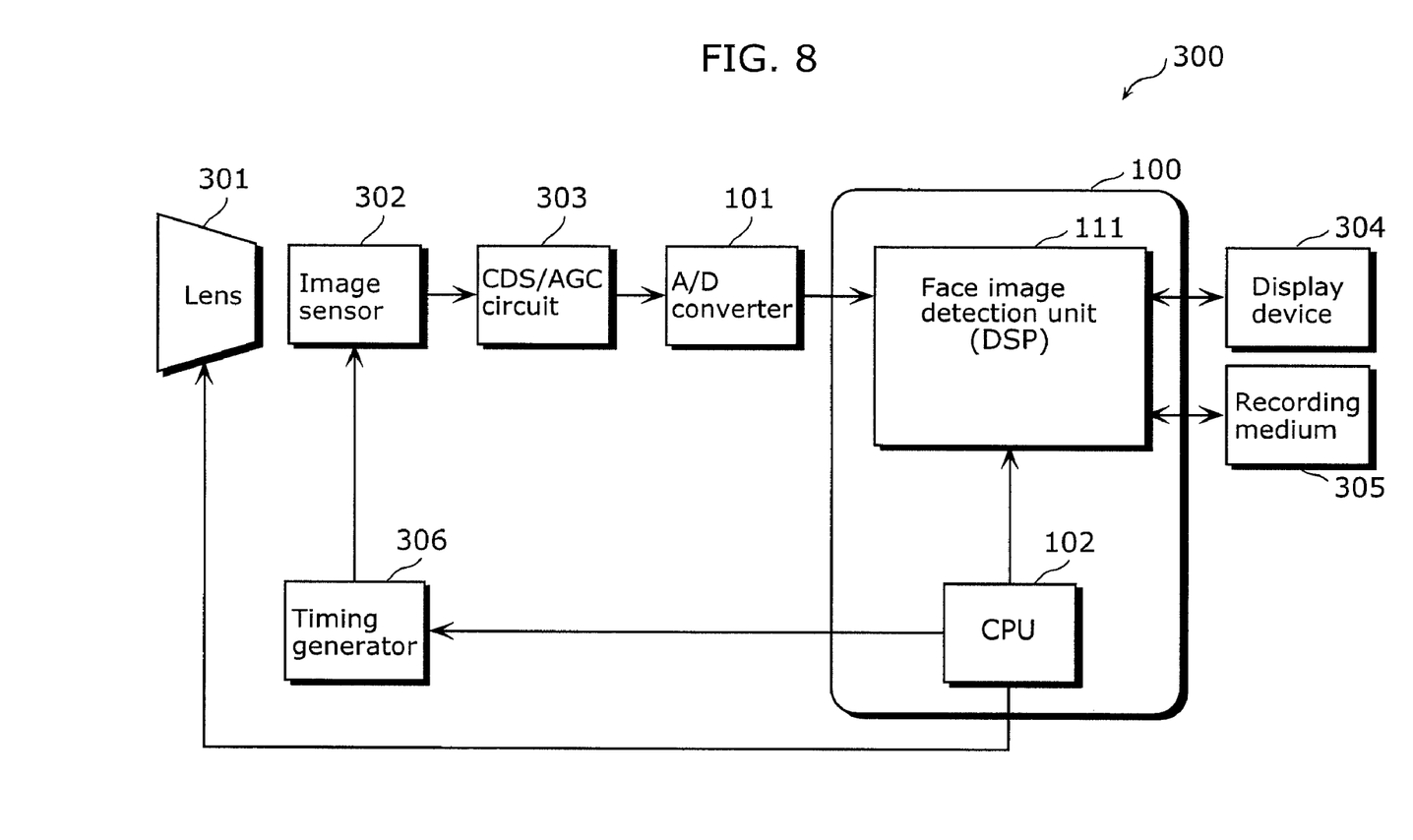
FIG. 8 shows an example of a configuration of digital still camera to which the face image detection device is incorporated.

FIG. 7 shows an example of appearance of a digital still camera to which the face image detection device 100 is incorporated. FIG. 8 shows an example configuration of a digital still camera to which the face image detection device 100 is incorporated. The digital still camera 300 includes a lens 301, an image sensor 302, a CDS/AGC circuit 303, an A/D converter 101, a face image detection device 100, a display device 304, a recording medium 305 and a timing generator 306.

The light collected by the lens 301 is converted into pixel signals by the image sensor 302. The CDS/AGC circuit 303 outputs image data signal by automatic gain adjustment as well as the correlated double sampling on the pixel signals outputted from the image sensor 302. The timing generator 306 generates driving pulse for the image sensor 302 at a predetermined interval. The display device 304 is a display device which displays the original image data and the location of the face image detected on the original image data, and is Liquid Crystal Display (LCD), for example. The recording medium is a recording device which records the original image data.

Incorporating the face image detection device 100 to a digital camera enables imaging of a person using the stable and highly accurate face image location detection function.

Furthermore, with the technology according to the present invention, not just face images, but locations of eyes in a face or a direction of the eyes can be detected with high accuracy.

Although only some exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

According to the face image detection device of the present invention, a location of a face image having any rotation angle can be detected by detecting the location of the face image once. Therefore, the location of the face image in a composition in which a baby is held or in a tilted composition when the baby is sleeping can be stably detected at high speed. Thus, the present invention can be applied to an imaging device such as digital cameras capable of performing automatic focus function and automatic exposure correction function on a person (face) at high speed and with high accuracy.

What is claimed is:

1. A face image detection device which detects a location of a face image using input image data, said face image detection device comprising:
   a rotated reduced image data generator operable to generate n pieces of rotated reduced image data by reducing the input image data and rotating the reduced input image data by 360×i/n, where n is an integer equal to or larger than 2 and i ranges from 0 to n−1, each of the rotated reduced image data is rotated at intervals of 360/n degrees; and
   a face detector operable to detect the location of the face image from among the n pieces of rotated reduced image data.

2. The face image detection device according to claim 1, further comprising:
   a rotated reduced image data identifier operable to identify the rotated reduced image data of which the location of the face image is detected by said face detector from among the n pieces of rotated reduced image data; and
   a face image locator operable to locate the face image in the input image data from the location of the face image detected by said face detector and a correspondence between the input image data and the rotated reduced image data.

3. The face image detection device according to claim 1, wherein said face detector is operable to detect the location of the face image from among the n pieces of rotated reduced image data using a method capable of detecting a location of a face image having at least within a 360/n-degree rotation range.

4. The face image detection device according to claim 1, further comprising:
   a rotated reduced image data identifier operable to identify a piece of rotated reduced image data of which the location of the face image is detected by said face detector from among the n pieces of rotated reduced image data; and
   an angle-setting value selector operable to select a single angle-setting value used for detecting a location of a face image having a rotation angle (−θ) from among n angle-setting values each of which is at intervals of 360/n degrees, based on a rotation angle θ of the rotated reduced image data with respect to the input image data, the rotated reduced image data being identified by said rotated reduced image data identifier,
   wherein said face detector is further operable to detect the location of the face image from the input image data using the single angle-setting value selected by said angle-setting value selector.

5. The face image detection device according to claim 4, wherein said angle-setting value selector is further operable to select, when plural pieces of the rotated reduced image data are identified by said rotated reduced image data identifier, plural angle-setting values each of which is used for detecting the location of the face image having the rotation angle (−θ) from among the n angle-setting values each of which is at intervals of 360/n degrees, based on plural rotation angles θ of the plural pieces of rotated reduced image data with respect to the input image data, and
   said face detector is further operable to sequentially take, when the plural pieces of the rotated reduced image data are identified by said rotated reduced image data identifier, a single angle-setting value from among the plural angle-setting values selected by said angle-setting value selector and detect the location of the face image from the input image data using the single angle-setting value that has been taken.

6. The face image detection device according to claim 4, wherein said face detector is operable to detect the location of the face image from among the n pieces of rotated reduced image data again, when the rotated reduced image data is not identified by said rotated reduced image data identifier.

7. The face image detection device according to claim 1, wherein said face detector is operable to detect the location of the face image from among the n pieces of rotated reduced image data by using a predetermined angle-setting value used for detecting a location of a face image having a single predetermined rotation angle,
   the face image detection device further comprises
   a rotated reduced image data identifier operable to identify a piece of rotated reduced image data of which the location of the face image are detected by said face detector, and
   said face detector is further operable to detect, when plural pieces of the rotated reduced image data are identified by said rotated reduced image data identifier, the location of the face image from among the plural pieces of rotated reduced image data identified by said rotated reduced image data identifier using the predetermined angle-setting value.

8. The face image detection device according to claim 7, wherein said face detector is operable to, when plural pieces of rotated reduced image data are identified by said rotated reduced image identifier, enlarge the plural pieces of the rotated reduced image data identified by said rotated reduced image data identifier, and detect the location of the face image from among the enlarged plural pieces of the rotated reduced image data using the single predetermined angle-setting value.

9. The face image detection device according to claim 1, wherein said face detector is operable to detect the location of the face image from among the n pieces of rotated reduced image data using a single predetermined angle-setting value used for detecting a location of a face image having a predetermined rotation angle.

10. The face image detection device according to claim 1, wherein said rotated reduced image data generator is further operable to generate a single piece of face detection image including the n pieces of rotated reduced image data, and
    said face detector is operable to detect the location of the face image from the single piece of face detection image.

11. An imaging apparatus which images a subject, comprising:
    an imager operable to image the subject and outputs image data;
    a rotated reduced image data generator operable to generate n pieces of rotated reduced image data by reducing the input image data and rotating the reduced input image data by 360×i/n, where n is an integer equal to or larger than 2 and i ranges from 0 to n−1, each of the rotated reduced image data is rotated at intervals of 360/n degrees; and a face detector operable to detect the location of the face image from among the n pieces of rotated reduced image data.

12. A face image detection method for detecting a location of a face image using input image data, said face image detection method comprising:

generating n pieces of rotated reduced image data, obtained by a rotated reduced image data generator, by reducing the input image data and rotating the reduced input image data by 360×i/n, where n is an integer equal to or larger than 2 and i ranges from 0 to n−1, each of the rotated reduced image data is rotated at intervals of 360/n degrees; and detecting the location of the face image from among the n pieces of rotated reduced image data.

* * * * *